INVENTOR,
OTTO E. RITTENBACH.

INVENTOR,
OTTO E. RITTENBACH.

United States Patent Office 3,422,430
Registered Jan. 14, 1969

3,422,430
DOPPLER RADAR WITH TARGET VELOCITY
DIRECTION INDICATOR
Otto E. Rittenbach, Neptune, N.J., assignor to the United
States of America as represented by the Secretary of
the Army
Filed Jan. 4, 1968, Ser. No. 695,685
U.S. Cl. 343—9                                        8 Claims
Int. Cl. G01s 9/44

ABSTRACT OF THE DISCLOSURE

Four Doppler radar sets of the zero-intermediate frequency type are shown. In all four the direction of target movement along the radar beam is obtained by comparing the relative phases of two Doppler signals resulting from two demodulation operations. In two of the embodiments, two demodulators or mixers are used, the local oscillator signals of which differ in phase by 90°. In the third embodiment a single mixer is used and the local oscillator signal of this mixer is periodically changed in phase by 90° and a switching arrangement used to derive the two Doppler signals which are then compared in phase to yield the target directivity. In the fourth embodiment the transmitted signal is periodically changed in phase by 90°

---

The invention described herein may be manufactured and used by or for the Government for governmental purposes without the payment to me of any royalties thereon.

This invention relates to radar circuitry which includes means to indicate the target directivity as well as speed. Simple zero intermediate frequency (or homodyne) Doppler radar sets comprise means to measure the amount of Doppler frequency shift caused by radial target movement in the beam of the radar set. The Doppler frequency shift will be the same for a given radial target speed whether the target is moving toward the radar or away from it. The present invention comprises radar circuitry by means of which the direction of radial target movement may be easily determined. The general method used is that of "phasing" in which the Doppler echo signal is demodulated by two local oscillator signals which have the same frequency as the transmitted signal, but differ in phase by 90°. The target direction is determined by comparing the relative phases of the two Doppler frequency signals resulting from the two demodulation operations. In two of the illustrated embodiments, two demodulators or mixers are utilized, the local oscillator signals of which differ in phase by 90°. In the third embodiment a single mixer is used and the local oscillator signal of this mixer is periodically changed in phase by 90° and a switching arrangement utilized to derive two Doppler signals, which are then compared in relative phase to yield the target directivity. The fourth embodiment is a modification of the third in which the transmitted signal is periodically changed in phase by 90° and circulator leakage is utilized as the local oscillator signal for the single mixer. In all embodiments, the two demodulated Doppler frequency signals are differentially phase shifted by 90° and then applied to a multiplier circuit. The polarity of the direct component of the multiplier output will be dependent on the target directivity. The directivity indicator may comprise a zero center meter, a pair of lamps connected to the multiplier via differently poled diodes, or a simple wattmeter.

It is thus an object of this invention to provide improved Doppler radar circuitry.

A further object of this invention is to provide novel Doppler radar circuitry in which target directivity as well as speed is indicated.

These and other objects and advantages of the invention will become apparent from the following detailed description and drawings, in which.

Figure 1:
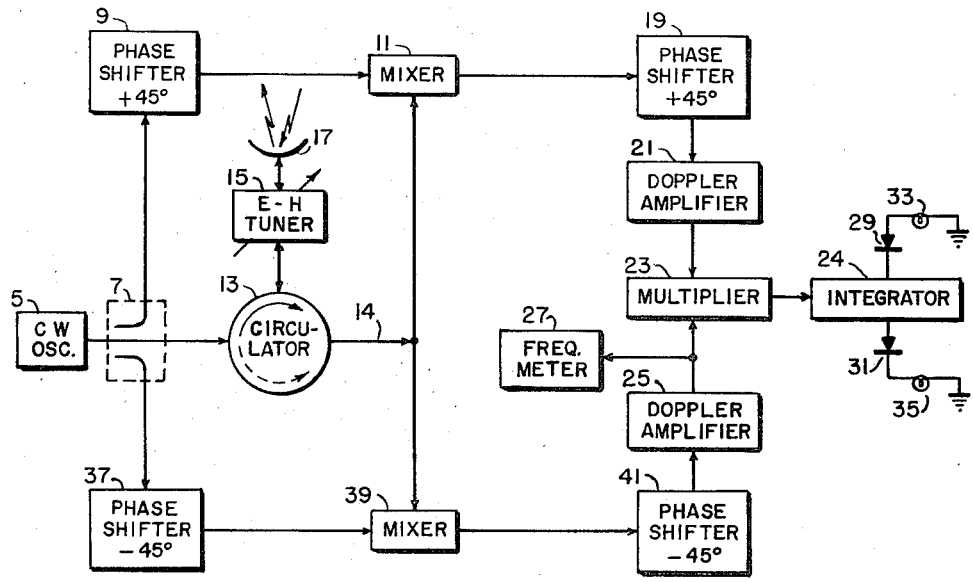
FIGURE 1 is a block diagram of a continuous wave Doppler radar with target directivity circuitry.

The circuit of FIGURE 1 includes a continuous wave microwave oscillator 5, the output of which is applied to one port of the circulator 13 via a directional coupler 7. The majority of the oscillator output goes through the directional coupler and thence to the antenna 17, however the directional coupler applies small portions of the oscillator output to the two microwave phase shifters 9 and 37. The antenna 17 is connected to another circulator port via an E-H tuner 15 which is used to adjust the voltage standing wave ratio (VSWR) in the antenna, for a reason which will be explained below. The direction of easy energy flow around the circulator is clockwise, as indicated by the solid-lined arrow. The target echo signals proceed from the antenna port clockwise to the output or mixer port 14. The echo signal is divided equally and applied to the two mixers 11 and 39. The local oscillator signal for the mixer 11 of the upper or first channel is the output of the microwave phase shifter 9, and that of the lower or second channel is the output of microwave phase shifter 37. Phase shifter 9 shifts the phase of the oscillator 5 by plus 45° and phase shifter 37 shifts the phase by minus 45°. Thus the two local oscillator signals applied to the two mixers differ by 90°. Circulators have unavoidable leakage in the direction opposite to that of easy energy flow. In FIGURE 1 the direction of this leakage is shown by the dashed-line arrow. This leakage will normally cause a small part of the output of oscillator 5 to be applied to the output port 14 together with the echo signals from the antenna, and this leakage will function as an undesired local oscillator signal. In all three embodiments of FIGURES 1 through 3, this leakage is cancelled by degrading or detuning the antenna circuit by means of the E-H tuner 15, so that a small portion of the output of oscillator 5 is reflected by the antenna circuit and proceeds around the circulator 13 clockwise toward the output port. If the amount of reflected energy travelling clockwise equals the amount of counterclockwise leakage at the output port and the phase relations are opposite, complete cancellation of the undesired leakage will be obtained.

The mixers 11 and 39 will produce alternating current output frequencies equal to the difference of their input frequencies. Thus only target echoes which have been Doppler frequency shifted by target movement will produce mixer alternating current outputs. The two Doppler signals in the outputs of the mixers resulting from the same moving target will have exactly the same frequency, but will differ in phase by 90°, due to the 90° phase difference in the local oscillator signals of the two channels. Further, if for a given target directivity, the upper channel Doppler signal in the mixer output leads the corresponding lower channel Doppler signal by 90°, these phase relations will be interchanged or reversed if the target directivity reverses. The Doppler signals of the two channels are differently phase shifted by 90° in the phase shifters 19 and 41, which have fixed phase shifts of plus 45° and minus 45° respectively. Due to the interchange in the leading and lagging phase relations caused by a change in target direction, as explained above, this differential 90° Doppler frequency phase shift will yield at the outputs of phase shifters 19 and 41 Doppler signals which are in phase for one direction of target movement and 180° out of phase for the opposite direction of target movement. The two phase-shifted Doppler signals are amplified by the Doppler frequency amplifiers 21 and 25, the outputs of which are applied to a multiplier 23. A multiplier will produce a positive direct current component of output if its two inputs are in phase and a negative direct current component if its two inputs are out of phase. Thus the multiplier direct current output polarity is an indication of target directivity, for example, positive multiplier output may indicate an incoming target and negative output an outgoing target, or vice versa. The multiplier direct current output polarity is indicated by the circuitry comprising the integrator 24, diodes 29 and 31 and lamps 33 and 35. The integrator 24, which may comprises merely a shunt capacitor blocks or absorbs the alternating components of the multiplier output. The diode 31 is so poled that it will pass positive integrator output and thus illuminate lamp 35 and diode 29 will pass negative integrator output to lamp 33. The lower channel of FIGURE 1 also includes a frequency meter 27, for indicating the target speed. This meter can be located in either channel, since it is not phase sensitive.

Figure 2:
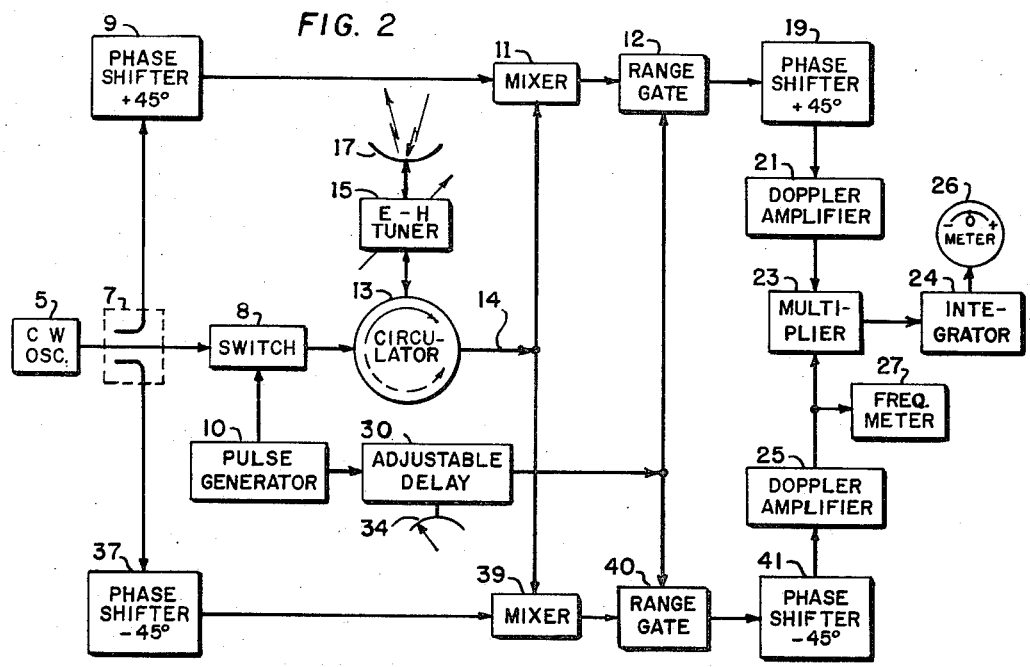
FIGURE 2 is a diagram of a pulse Doppler radar with target directivity circuitry.

The Doppler radar set of FIGURE 2 is similar to that of FIGURE 1 except that it is a pulse Doppler radar and is thus capable of measuring target range as well as target speed and direction. In all of the figures, correspondingly referenced circuit elements perform the same function. In the circuit of FIGURE 2, the electronic switch 8, pulse generator 10, adjustable delay circuit 30 and the two range gates 12 and 40 provide the pulse Doppler capability. The pulse generator 10 has its output arranged to periodically open the electronic switch 8 to apply the output of oscillator 5 to the circulator and thence to the antenna. The pulse generator output is also applied to adjustable delay circuit 30, the delay control 34 of which is calibrated in range. The output of circuit 30 is applied in parallel to the gating inputs of the range gates 12 and 40 in the first and second channels respectively. Thus the range gates of both channels are simultaneously opened at a time following the pulse transmission equal to the delay setting of circuit 30. Thus moving targets at any desired range can be selected. This eliminates interference where there is more than one moving target in the radar beam. The range gates of FIGURE 2 will pass only echoes from moving targets whose round trip transit time is equal to the delay of the delay circuit 30, therefore the range will be the distance the pulse travels in one half of the delay setting of circuit 30. Thus the delay control 34 can be calibrated directly in terms of range. The circuit of FIGURE 2 includes a target direction indicator different from that of FIGURE 1. In place of the diodes and lamps, a zero-center voltmeter or ammeter 26 is utilized for indicating the polarity of the integrator output. A negative deflection of the meter will indicate one direction of target movement and a positive deflection the opposite direction. The remaining circuitry of FIGURE 2 not specifically referred to functions in the same manner as the correspondingly referenced circuitry of FIGURE 1.

Figure 3:
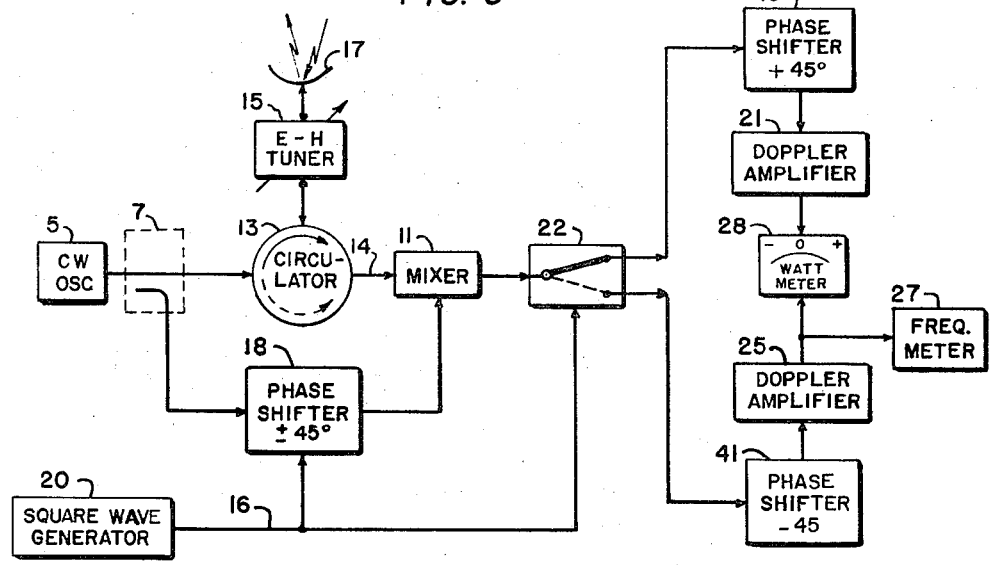
FIGURE 3 is a diagram of a CW Doppler radar circuit which requires only a single mixer to extract the directivity information from the Doppler echo signal.

The circuit of FIGURE 3 comprises a continuous wave oscillator 5 the output of which is applied to the antenna 17 via the circulator 13 and E–H tuner 15, as in the other embodiments. The directional coupler 7 applies a small portion of the oscillator output to the input of controllable phase shifter 18. The single mixer 11 receives the echo signals from the output port 14 of the circulator. The local oscillator input of the mixer is the output of phase shifter 18. The electronic switch 22 alternately applies the mixer output to the first and second Doppler frequency channels comprising the phase shifters 19 and 41 and Doppler amplifiers 21 and 25. The phase shifter 18 and electronic switch 22 are both controlled by the output of square wave generator 20 via lead 16. The square wave generator as a 50% duty cycle, that is, its output at a first level for 50% of the time and at a second level for the other 50% of the time. The phase shifter 18 will shift the phase of the oscillator by either plus or minus 45°, depending on the level of the square wave generator output. The square wave generator will synchronously switch the mixer output to the first and second channels via switch 22. Thus the local oscillator signal has either one or the other of two phases which differ by 90°. Further, the demodulated Doppler signals in the mixer output resulting from these two phases are separated by means of the synchronous action of the switch 22 and applied to separate channels. The output of the switch 22 will include the frequency of the square wave generator as well as the Doppler signals and for this reason the frequency of generator 20 must be at least twice as high as the highest Doppler frequency to be processed. In this way the square wave frequency can be filtered out, leaving only the Doppler signals in the first and second channels. This can be easily accomplished if the Doppler amplifiers 21 and 25 have bandpass characteristics which will pass all Doppler frequency signals, but block the square wave generator frequency. With this technique, the outputs of both Doppler amplifiers will comprise pure Doppler signals which are either in phase or 180° out of phase, as in the other two embodiments. The circuit of FIGURE 3 includes a third alternative means for indicating the target directivity. This is the zero-center wattmeter 28, to which the outputs of the first and second channels are applied. An ordinary wattmeter of the type used in 60 cycle power circuits comprises a pair of coils and the wattmeter indication is proportional to the direct current component of the product of the inputs to the two coils. Thus for two inputs of the same phase, the indication will be positive and for inputs 180° out of phase the indication will be negative. Thus, a zero-center wattmeter can be used to indicate the phase relationship of the two channels and hence the target directivity. It should be noted that the inertia and damping of the wattmeter movement provides an integrating effect which absorbs the alternating component in the product of the two Doppler signals.

Figure 4:
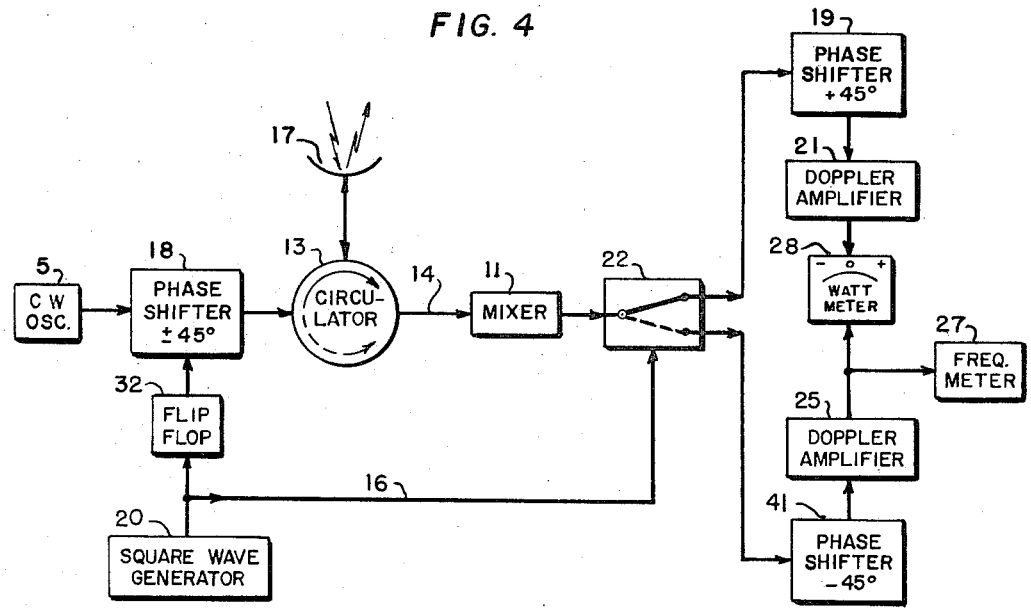
FIGURE 4 is a modification of the circuit of FIGURE 3.

In the embodiment of FIGURE 4, the controllable phase shifter 18 is inserted between the oscillator 5 and the circulator. The phase shifter has its control input connected to the output of flip-flop 32, which has its input connected to the output of square wave generator 20. No E–H tuner is needed in the antenna circuit, as in the other embodiments. The flip-flop divides the output of generator 20 by two, thus the transmitted radar beam is periodically shifted in phase by 90° at half the frequency of generator 20. The input to the mixer 11 will comprise both the target echo signal and the local oscillator signal which comprise the counterclockwise leakage around the circulator. Since both of these components of mixer input are undergoing nonsynchronous phase changes at half the frequency of generator 20, the sum or resultant of these components will be changing phase at the frequency of the generator 20. For this reason the electronic switch 22 must operate at twice the frequency of the phase changes of the transmitted signal. The flip-flop 32 provides this desired 2 to 1 relationship between the switching rates of the switch 22 and the phase shifter 18. The remainder of the circuitry of FIGURE 4 comprises the two Doppler frequency channels which are the same in circuitry and function as those of FIGURE 3.

In the circuit of FIGURE 4 the sum or resultant of the signals at the mixer input will be undergoing phase changes at the same rate as that of the generator 20, however the relative length of time which the resultant signal spends at each phase will vary with the target range. This will cause some interference with the Doppler signals in the first and second channels. This interference can be reduced if the frequency and/or duty cycle of the generator 20 is made variable. The generator frequency and/or duty cycle can then be adjusted to optimize the response to a particular moving target.

The multipliers of FIGURES 1 and 2 may be of the type commonly used in analog computers, for example Hall effect devices. Also, any of the three different target directivity indicating devices shown may be used with any of the other embodiments. It should be noted that the time constants of the integrators of FIGURES 1 and 2 and of the wattmeters of FIGURES 3 and 4 can be chosen to discriminate against oscillating Doppler random signals. Such random signals will tend to produce alternate in and out indications, however if the aforementioned time constants are made long compared to the period of this random oscillation, the directivity indications will not respond to such random signals.

While the invention has been illustrated in connection with illustrative embodiments, the inventive concepts disclosed herein are of general application and hence the invention should be limited only by the scope of the appended claims.

What is claimed is:

1. A Doppler radar set comprising, means to transmit a radar beam and to receive target echoes, means to demodulate said target echoes by means of two local oscillator signals which have the same frequency as said radar beam but differ in phase by 90°, thereby obtaining a pair of Doppler frequency signals differing in phase by 90°, means for differentially shifting the phases of said Doppler frequency signals by 90°, and a multiplier for obtaining the product of said differentially phase shifted Doppler signals, and means for indicating the polarity of the direct current component in the output of said multiplier.

2. The radar set of claim 1 wherein said last-named means comprises an integrator connected to the output of said multiplier and a pair of lamps connected to the output of said integrator via differently poled diodes.

3. The radar set of claim 1 wherein said last-named means comprises an integrator connected to the output of said multiplier and a zero-center meter connected to the output of said integrator, the sense of deflection of said meter indicating the polarity of the output of said integrator.

4. The radar set of claim 1 wherein said multiplier comprises a zero-center wattmeter to which said differentially phase shifted Doppler signals are applied, the sense of the deflection of said wattmeter indicating the polarity of the product of said Doppler signals.

5. A Doppler radar set comprising; an oscillator, means to apply the output of said oscillator to an antenna and to obtain target echo signals from said antenna, means to apply said target echo signals to a mixer, a controllable phase shifter having as its input a portion of the output of said oscillator and having its output connected to said mixer as a local oscillator signal therefor, a square wave generator having its output connected to the control input of said phase shifter, said generator being arranged to periodically change the phase shift of said phase shifter by 90°, means to apply the output of said mixer to an electronic switch, first and second Doppler frequency channels connected to the output of said electronic switch, said electronic switch having a control input connected to the output of said square wave generator, whereby said square wave generator periodically switches the input of said switch between said channels in synchronism with the phase changes of said phase shifter, the frequency of said generator being at least twice that of the highest Doppler frequency signal to be processed, said channels comprising means to differentially shift the Doppler frequency signals therein by 90°, and means to measure the relative phases of said Doppler frequency signals in said two channels.

6. The radar set of claim 5 wherein said last-named means comprises a zero-center wattmeter.

7. A Doppler radar set comprising, a continuous wave oscillator, means to periodically shift the phase of the output of said oscillator by 90°, at a given rate, means to radiate the phase shifted oscillator output and to receive target echo signals, a mixer, means to apply to said mixer said echo signals plus a sample of said phase shifted oscillator output, means to apply the output of said mixer to an electronic switch, first and second Doppler frequency channels connected to the output of said electronic switch whereby the input of said switch is periodically switched between said channels, said switch being operated at twice said given rate, said channels comprising means to differentially shift the Doppler frequency signal therein by 90°, and means to measure the relative phases of said phase shifted Doppler frequency signals.

8. The radar set of claim 7 wherein said last-named means comprises a zero-center wattmeter.

References Cited

UNITED STATES PATENTS 3,229,284   1/1966   Rubin _____ 343—9

RODNEY D. BENNETT, *Primary Examiner.*

CHARLES L. WHITHAM, *Assistant Examiner.*